July 20, 1943.  W. W. WEINRICH ET AL  2,324,746
CATALYTIC ISOMERIZATION OF PARAFFINIC HYDROCARBONS
Filed Aug. 27, 1940
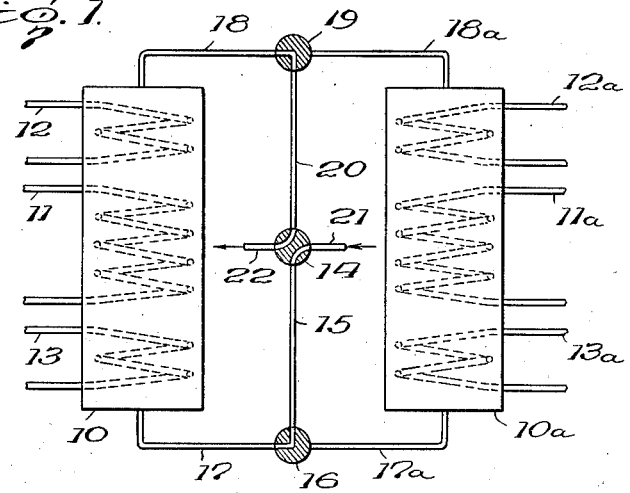
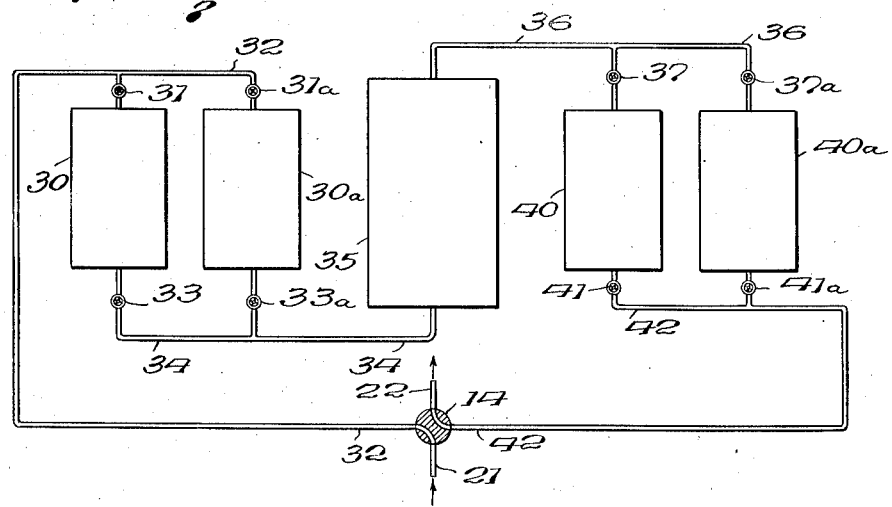
Inventors
William W. Weinrich
James M. Yost
By A. M. Houghton
their Attorney Patented July 20, 1943

2,324,746

UNITED STATES PATENT OFFICE 2,324,746

CATALYTIC ISOMERIZATION OF PARAFFINIC HYDROCARBONS

William W. Weinrich, Oakmont, and James M. Yost, Sewickley, Pa., assignors to Gulf Research & Development Company, Pittsburgh, Pa., a corporation of Delaware Application August 27, 1940, Serial No. 354,452

3 Claims. (Cl. 260—683.5)

This invention relates to the catalytic isomerization of paraffinic hydrocarbons; and it is particularly concerned with a method for isomerizing paraffinic hydrocarbons which comprises passing a gas containing a paraffinic hydrocarbon through a mass of solid supported aluminum halide catalyst, maintaining the end portions of the catalyst mass alternately at an isomerization temperature and an aluminum halide-condensing temperature, respectively, and maintaining the middle portion continuously at an isomerization temperature, the end portions each being about one quarter to three quarters the size of the middle portion and the direction of flow being first through the two hot portions and then through the cool portion, interrupting the flow of gas through the catalyst mass when the concentration in per cent by weight of aluminum halide in the cool end portion reaches a value in excess of the concentration of aluminum halide in the middle portion and not greater than about 35 per cent by weight, and before the concentration of aluminum halide in the middle portion drops substantially, cooling the hot end portion to an aluminum halide-condensing temperature, heating the cool end portion to an isomerization temperature, and reversing the direction of flow of gas through the catalyst mass; all as more fully her 'nafter set forth and as claimed.

The object achieved by this invention is to provide a method and apparatus for isomerizing paraffinic hydrocarbons in the presence of a solid aluminum halide catalyst at a temperature at which the aluminum halide has a substantial vapor pressure, without excessive variation in the amount of active catalyst or substantial loss of the catalyst, and with continuously renewed catalyst surfaces whereby substantial variation in catalyst activity is obviated and either intermittent or continuous cyclic operation can be effected.

Normal paraffins containing four or more carbon atoms, for example, normal butane and normal pentane, can be isomerized to iso-paraffins by contacting them with an aluminum halide catalyst, especially aluminum chloride or aluminum bromide. This isomerization is advantageously carried out in the presence of a hydrogen halide, especially in cases where aluminum chloride is employed as the catalyst. A convenient manner of carrying out such an isomerization procedure comprises passing the vapor of a normal paraffin along with a minor quantity of hydrogen halide over a solid body of catalyst composed of an inert carrier material such as pumice, granulated carbon, fuller's earth or the like having an aluminum halide distributed over its surface.

In the commercial production of iso-paraffins by such a procedure it is important to maintain a relatively rapid rate of reaction. In order that substantial rates of reaction may be attained without the necessity of employing extremely large bodies of catalyst and correspondingly large catalyst chambers, it is generally desirable to use relative high temperatures. Thus, in the isomerization of normal butane by contact with a solid supported aluminum chloride catalyst it is desirable to employ a temperature of about 125° to 150° C. In carrying out the same reaction in the presence of a solid supported aluminum bromide catalyst, which is more active than an aluminum chloride catalyst, a lower temperature, usually about 100° C., may be used. In the isomerization of normal pentane elevated temperatures are also desirable for commercial production.

At such elevated temperatures, however, the aluminum halides have substantial vapor pressures and volatilize to a substantial degree. The flowing gas stream carries the volatilized catalyst out of the reaction zone, which results in a diminution of the amount of catalyst available for reaction, and the rate of isomerization falls off as the reaction proceeds. Also, the volatilized aluminum halide must be condensed and separated from the paraffins.

The disadvantages resulting from catalyst volatilization can be obviated by carrying out the isomerization according to the method of our invention, by passing a gas containing a paraffinic hydrocarbon through a mass of solid supported aluminum halide catalyst, maintaining the end portions of the catalyst mass alternately at an isomerization temperature and an aluminum halide-condensing temperature, respectively, and maintaining the middle portion of the catalyst mass continuously at an isomerization temperature, the end portions each being about one quarter to three quarters the size of the middle portion and the direction of flow of the hydrocarbon gas being first through the two hot portions and then through the cool portion, interrupting the flow of gas through the catalyst mass when the concentration of aluminum halide in the cool end portion reaches a value in excess of the concentration of aluminum halide in the middle portion and not greater than about 35 per cent by weight, and before the concentration of aluminum halide in the middle portion drops substantially, cooling the hot end portion to an aluminum halide-condensing temperature, heating the cool end portion to an isomerization temperature, and reversing the direction of flow of gas through the catalyst mass.

This procedure may be carried out in various types of apparatus and in various ways. Thus, the catalyst mass may be a single, continuous bed of solid supported catalyst, enclosed in an appropriate casing, which is provided with temperature control means whereby the middle portion of the mass can be continuously maintained at isomerization temperatures, and whose end portions can be maintained at either isomerization or aluminum halide-condensing temperatures. These end portions, which are advantageously of about equal size, are also advantageously each about one quarter to three quarters the size of the middle portion of the mass.

Alternatively the mass of solid-supported catalyst may comprise three distinct beds of catalyst, which may be enclosed in a common casing, or which may be situated in separate chambers appropriately connected. The end catalyst beds or portions of the mass, which are advantageously of about equal size, are about one quarter to three quarters the size of the middle bed or portion. The large middle bed is provided with temperature control means whereby an isomerization temperature can be maintained therein, while the small end beds are provided with temperature control means for maintaining either isomerization or aluminum halide-condensing temperatures therein.

By carrying out isomerization in the manner of our invention the problem of catalyst volatilization is greatly reduced and at the same time the proportion of total catalyst in the system which is active remains high at all times. At no time does the catalyst concentration in the two hot zones drop to such a point that the rate of isomerization is greatly reduced. The process provides for both economical catalyst utilization and substantially uniform yield.

Our procedure is flexible in practice and readily adaptable to a variety of circumstances and requirements. At the commencement of operation the aluminum halide catalyst may be distributed through the mass of solid support in various ways. However, it is advantageous to begin with the major part of the aluminum halide in the first and middle portions of the mass. These portions are then brought to an isomerization temperature and the last portion to an aluminum halide-condensing temperature. Gas is then conducted in sequence through the first, middle and last portions of the mass and this flow is continued until the desired final concentration of aluminum halide in the cool end portion is attained. The value of this final concentration will depend upon various operating factors such as temperature, pressure, flow rate, total catalyst in the system, and the size and proportioning of the catalyst mass. It is advantageous, however, to limit the final concentration in the end bed or portion to not more than about 35 per cent by weight of the combined aluminum halide and solid support in this end portion. Concentrations above about 35 per cent render condensation difficult; a bed containing more catalyst is not an efficient condenser.

When the desired final concentration in the cool end portion is reached, the flow of gas through the catalyst mass is interrupted, the hot end portion is cooled to an aluminum halide-condensing temperature, the cool end portion is heated to an isomerization temperature, and the flow of gas is reversed through the mass. After a few passes, generally not more than about four, the catalyst will distribute itself in a manner characteristic of the system, and its operating conditions. When this characteristic state is reached, the net effect of a pass on catalyst redistribution will be to remove a certain amount of catalyst from the hot end portion and deposit a corresponding amount of catalyst in the cold end portion; the concentration of catalyst in the large middle portion will fluctuate moderately, rising somewhat in the early part of the pass and falling in the latter part, but its final value, and therefore the average concentration, will remain substantially the same as the initial concentration.

When this stage of operation is reached, the catalyst distribution at the commencement of a pass, for a given set of operating conditions, is constant. This constant distribution we call the "lined out" distribution. This lined out distribution represents maximum efficiency; therefore, in commencing operation with an uncharged system it is advantageous to distribute the catalyst throughout the mass at the lined out value. Then from the moment of commencing operation the system will be working at maximum efficiency; no preliminary passes are required to line out the catalyst.

Our method of operation has the additional alvantage that the aluminum halide, being continuously volatilized and redeposited, constantly forms new, more active catalyst surfaces so that its activity does not depreciate with use. Continued operation for many days leaves the catalyst substantially as active as at the commencement of operation.

Processes employing a single mass of catalyst or a system of three beds of catalyst are subject to periodic interruption to cool a hot portion and heat a cool portion of the mass. Complete continuity of operation can be attained by modifications of the hereinbefore described apparatus, wherein duplicate masses of catalyst are employed.

In the accompanying drawing are illustrated two types of apparatus adapted to carry out the process of our invention in continuous operations.

In the drawing,

Fig. 1 is a diagrammatic representation of one type of apparatus employing two beds of catalyst, and Fig. 2 is a diagrammatic representation of a second type of apparatus employing five beds of catalyst.

In Fig. 1, catalyst case 10 is filled with solid catalyst support and is provided with a large heating or cooling coil 11 in its middle portion and with smaller heating or cooling coils 12 and 13 at top and bottom respectively. These coils are connected with suitable sources of heating or cooling fluid (not shown). Catalyst case 10a, similar in size and construction to case 10, is filled with a like amount of solid catalyst support, and is similarly provided with a large central heating or cooling coil 11a and with small heating or cooling coils 12a and 13a at top and bottom respectively. In cases 10 and 10a, the relative sizes and placing of the coils are such that the end portions whose temperatures are controlled by the small end coils are each about one quarter to three quarters the size of the middle portion, whose temperature is regulated by the middle coil.

Case 10 is connected at its bottom with reversing valve 14 through conduit 15, two-port three-way valve 16 and conduit 17, and is connected at its top with reversing valve 14 through conduit 18, two-way valve 19 and conduit 20. Reversing valve 14 is provided with a gas inlet conduit 21 leading from a suitable source of hydrocarbon gas (not shown) and a gas outlet conduit 22 leading to a fractionating and/or storage system (not shown). Case 10a is similarly connected with reversing valve 14; from the bottom through conduit 15, valve 16, and conduit 17a and from the top through conduit 18a, valve 19 and conduit 20.

In Fig. 2, small catalyst cases 30 and 30a, each filled with a like amount of solid catalyst carrier and provided with temperature control means (not shown) are connected at their tops through valves 31 and 31a, respectively, and conduit 32, to reversing valve 14. Valve 14 is connected with a gas inlet conduit 21 leading from a suitable source of paraffinic hydrocarbon gas (not shown) and with a gas outlet conduit 22 leading to a suitable fractionating and/or storage system (not shown).

The bottoms of cases 30 and 30a are connected through valves 33 and 33a, respectively, and conduit 34 to the bottom of large catalyst case 35, containing about twice as much solid catalyst support as either case 30 or 30a and provided with temperature control means (not shown). The top of case 35 is connected through conduit 36 and valve 37 to the top of small catalyst case 40 and through conduit 36 and valve 37a to the top of small catalyst case 40a. Cases 40 and 40a are the same size as cases 30 and 30a, are filled with a like amount of solid catalyst carrier and are provided with temperature control means (not shown). They are connected at their bottoms through valves 41 and 41a, respectively, and conduit 42, to reversing valve 14.

In operating the apparatus of Fig. 1, the beds in cases 10 and 10a, which may be formed of any of the usual catalyst supporting materials such as pumice, fuller's earth and the like, are charged with catalyst at the lined out value, which is determined from previous experience at the selected conditions of operation. By means of the coils in case 10, the bottom and middle portions of that case are brought to an isomerization temperature and the top portion is brought to an aluminum halide-condensing temperature. Valves 14, 16 and 19 are properly set, gas containing the paraffin to be isomerized is passed in through conduit 21, through valve 14, conduit 15, valve 16 and conduit 17 to the bottom of case 10, thence up through the catalyst bed in case 10, out the top of case 10 and through conduit 18, valve 19, conduit 20, valve 14 and exit conduit 22 to the fractionating and/or storage system.

This flow is interrupted when the concentration of aluminum halide in the top, cool portion of case 10 reaches a value in excess of the concentration of aluminum halide in the middle portion and not greater than about 35 per cent by weight, and before the concentration of aluminum halide in this middle portion drops substantially.

During the flow through case 10, case 10a is brought to the proper temperature condition (hot in the middle and bottom portions, cool in the top portions). When the flow through case 10 has been completed, valves 16 and 19 are turned so as to divert the gas stream through case 10a from bottom to top in a manner corresponding to the flow through case 10. This flow is continued until the same state of catalyst distribution is achieved in case 10a as was achieved in the flow through case 10. During the flow through case 10a, the top end of case 10 is heated to isomerization temperature and the bottom end is cooled to aluminum-halide-condensing temperature. When the flow of gas through case 10a is completed, valves 14, 16 and 19 are turned so as to direct the gas stream through conduit 20, valve 19, conduit 18, case 10, conduit 17, valve 16, conduit 15 and thence through valve 14 to conduit 22, etc. This stage of the cycle is continued until the catalyst distribution in case 10 is restored to its original state. Case 10a in the meantime is brought to the proper temperature condition for a reverse pass through it by heating the top end and cooling the bottom end.

When the flow through case 10 is finished, valves 16 and 19 are turned to direct the gas stream through case 10a in the same order as through case 10 in the preceding pass, i. e. from top to bottom. This last pass or stage of the cycle is continued until the catalyst in case 10a is redistributed in its original condition. In the meantime, case 10 is brought to its original temperature condition. The system is then in a state of readiness for a second cycle.

Since the above cycle began with the catalyst properly lined out, it represents operation at all subsequent stages of operation unless the operating conditions are varied. A very small amount of catalyst may be carried out of the system. It is readily replaced by occasionally vaporizing a small amount of aluminum halide into the entering stream of gas.

In principle, the apparatus of Fig. 2 operates similarly. Cases 30, 35 and 40 correspond, respectively, to the bottom, middle and top portions of case 10 of Fig. 1. They are initially charged with catalyst at the lined out value, and cases 30 and 35 are brought to an isomerizing temperature and case 40 to an aluminum halide-condensing temperature. Gas enters through conduit 21; the valves are set to conduct this gas through valve 14, conduit 32, valve 31, case 30, valve 33, conduit 34, case 35, conduit 36, valve 37, case 40, valve 41, conduit 42, valve 14 and exit conduit 22 to the fractionating and/or storage system. The flow is interrupted when the concentration of aluminum halide in case 40 reaches a value in excess of the concentration of aluminum halide in case 35 and not greater than about 35 per cent, and before the concentration of aluminum halide in the latter case drops substantially.

During this period of flow, cases 30a and 40a are brought to isomerization and aluminum halide-condensing temperatures, respectively. Then valves 31, 33, 37 and 41 are closed, valves 31a, 33a, 37a and 41a are opened, and the flow commences through cases 30a, 35 and 40a until the catalyst distribution in these cases is the same as in cases 30, 35 and 40 at the end of the preceding pass. During this time cases 30 and 40 are brought to condensing and isomerizing temperatures, respectively. Then valve 14 is set to cause the entering gas to pass through conduit 42 and the other valves are set to direct the gas in sequence through cases 40, 35 and 30.

This third pass or stage of the cycle is continued until the catalyst is redistributed in cases 30, 35 and 40 as it was originally. In the meantime, cases 30a and 40a are brought to condensing and isomerizing temperatures, respectively. Then the valves are turned to cause the gas to flow in sequence through cases 40a 35 and 30a until their original state of catalyst distribution is achieved. During this last stage or pass, cases 30 and 40 are brought to their original temperatures. The system is then ready for the next cycle. Condensation of aluminum halide in the lines and valves between the catalyst cases of the apparatus of Fig. 2 may necessitate removal of accumulated deposits thereof from time to time. Suitable devices for loosening such deposits without interrupting the operation of the apparatus may be installed if desired. Such difficulties may be reduced or obviated by shortening connecting lines or by eliminating such lines and valves altogether, e. g. by employing the apparatus of Fig. 1.

The principle of operation of the process of our invention is further illustrated by the following specific example, wherein a three-case system was employed, the operation of which was similar to that described for one pass through three beds of the above-outlined five-bed apparatus.

In this example the system comprised three cases, the two end cases each being 6 feet in length and 1.5 feet internal diameter, and the middle case being 12 feet in length and 1.5 feet internal diameter. One of the small end cases and the middle case were filled with an AlCl₃-pumice type of catalyst prepared by subliming anhydrous aluminum chloride onto pea-sized pumice until the AlCl₃ constituted 30 per cent of the mass. The second end case was charged with the same amount of pumice as the first end case, but no AlCl₃. In all, 317.2 pounds of AlCl₃ were charged to the system. The catalyst-containing cases were brought to and maintained at 135° C. and the catalyst-free case was brought to and maintained at 77° C. Substantially pure n-butane containing 4.5 mol per cent of HCl was conducted in sequence through the first end case (containing catalyst), the middle case, and the second end case (containing no catalyst) at a space velocity of 900 cubic feet (STP) per hour per cubic foot of catalyst space, or a total flow rate of 26,680 cubic feet (STP) per hour, under a pressure of 125 pounds per square inch gage. The contact time was 14.6 seconds.

The flow was continued for 51.7 minutes, when the catalyst concentration in the cold end case reached 30 per cent. The concentration in the hot end case and the middle case in the meantime dropped to 13.4 per cent and 26.3 per cent respectively. The conversion of n-butane varied from 41.5 per cent at the commencement of flow to 32.7 per cent when the catalyst concentration in the cold end case was 30 per cent. The flow was then discontinued, the cold end case was heated to 135°, the hot end case was cooled to 77° C., and the direction of flow was reversed.

These passes in opposite direction were continued, each pass ending when the catalyst concentration in the condensing case reached 30 per cent. At the beginning of the fourth pass, the catalyst concentrations in the three cases were lined out. At the beginning and end of this pass, the catalyst concentrations were as given in the following table.

|  | First small case | Large case | Second small case |
|---|---|---|---|
| Initial catalyst concentration____percent__ | 30 | 24.2 | 18 |
| Final catalyst concentration_____do____ | 18 | 24.2 | 30 |

Thus the catalyst distribution had attained, by the beginning of the fourth pass, its lined out value. The fourth pass is, therefore, representative of all subsequent passes under the same conditions of operation.

During this fourth pass and during subsequent passes, the conversion of n-butane varied from 38 per cent at the beginning to 33.2 per cent at the end of each pass, the average conversion being 35.9 per cent. Thus, the average conversion varied only a few per cent from the extremes. Moreover, an average of 76.6 per cent, or more than three quarters of the total catalyst, remained in the hot or isomerizing portion of the system throughout the process. This accounts for the high conversion rate. The duration of a pass was about 33 minutes.

Constancy of yield and a high rate of conversion were maintained throughout 500 hours of such operation, interrupted at the end of each pass only enough to cool and heat the small cases. The catalyst was not fouled during this time. The loss of catalyst per pass was only about 0.0436 per cent of the total, a quantity which was readily replaced by occasionally passing the incoming n-butane vapor over a heated bed of catalyst.

The above example illustrates how, starting with an arbitrary distribution of catalyst, a lined out distribution is quickly attained. Better results are obtained by starting with the lined out distribution. In this particular example, the first bed would be charged with 30 per cent, the middle bed with 24.2 per cent and the last bed with 18 per cent AlCl₃.

Various modifications of the process of our invention and the described apparatus will be obvious to one skilled in the art and are within the scope of this invention, and our invention is not limited in details to such method and apparatus except as defined hereinafter in the appended claims.

What we claim is:

1. In the continuous vapor phase isomerization of paraffinic hydrocarbons, the steps comprising passing a gas containing a paraffinic hydrocarbon and a hydrogen halide through a series of beds of solid supported aluminum halide catalyst comprising a first small bed, a large bed and a second small bed, said small beds each being about one quarter to three quarters the size of said large bed, maintaining the first small bed and the large bed at an isomerization temperature and the second small bed at an aluminum halide-condensing temperature, continuing the flow of gas until the concentration of aluminum halide in said second small bed reaches a value in excess of the concentration of aluminum halide in said large bed and not greater than about 35 per cent by weight and the concentration of aluminum halide in said large bed is at least about as great as its initial value, then diverting the flow of said gas through a second series of beds comprising a first small bed, said large bed and a second small bed, said small beds each being about one quarter to three quarters the size of said large bed and said first small bed and said large bed being maintained at an isomerization temperature and said second small bed at an aluminum halide-condensing temperature, continuing the flow of gas until the concentration of aluminum halide in the second small bed reaches a value in excess of the concentration of aluminum halide in said large bed and not greater than about 35 per cent by weight and the concentration in said large bed is at least about as great as its initial concentration, then passing the gas through said first series of beds in a direction opposite to the previous flow through said beds, while maintaining the first two beds through which the gas passes at an isomerization temperature and the third bed at an aluminum halide-condensing temperature, continuing the flow of gas until the aluminum halide concentrations in the respective beds have been adjusted substantially to the proportions existing therein at the start of the previous run through said beds, then passing said gas through the second series of beds in a direction opposite to the previous direction of flow through said beds while maintaining the first two beds through which the gas passes at an isomerization temperature and the third bed at an aluminum halide-condensing temperature, and continuing the flow of gas until the aluminum halide concentrations in the respective beds have been adjusted substantially to the proportions existing therein at the start of the previous run through said beds.

2. In the isomerization of a continuous stream of a hydrocarbon with a catalyst of migrant nature which is mounted on a non-volatile and non-migrant carrier material, the process which comprises using two series of three beds of such mounted catalyst, arranged so that one particular bed is common to each series of three and always serves as the second bed of the series, proportioning the volume of the beds in each series so that the first and third of each series of three will have about one quarter to three quarters the volume of the second bed of the series, operating in a four step repetitive cycle wherein the stream of hydrocarbon is passed through one or another but not both series of beds, wherein the two series of beds are used alternately, and wherein the direction of passage of the stream of fluid through a series of beds is reversed in each successive use of that series of beds; maintaining the first and second bed of each series at a reaction temperature and the third bed at a catalyst-deposition temperature during the first passage and alternate subsequent passages of fluid therethrough, and maintaining the third and second beds of each series of three at a reaction temperature and the first bed at a catalyst-deposition temperature during the second and alternate subsequent passages of fluid therethrough, continuing the flow of fluid through a series of beds from reaction end to deposition end until the concentration of catalyst in the bed maintained at deposition temperature reaches a value in excess of the concentration of catalyst in the second bed of the series of three and a value not greater than about 35 per cent by weight, and before the concentration of catalyst in the second bed of the series drops substantially; then switching the flow to the other series of catalyst beds while the bed which has just served as a deposition bed is brought to a reaction temperature and the opposite end bed of that series is brought to a deposition temperature.

3. In the continuous vapor phase isomerization of paraffinic hydrocarbons, the steps comprising passing a gas containing a paraffinic hydrocarbon and a hydrogen halide through a series of beds of solid supported aluminum halide catalyst comprising a first small bed, a large bed, and a second small bed, maintaining the first small bed and the large bed at an isomerization temperature and the second small bed at an aluminum halide condensing temperature, continuing the flow of gas until the concentration of aluminum halide in said second small bed reaches a value substantially in excess of its original value, then diverting the flow of said gas through a second series of beds comprising a first small bed, said large bed and a second small bed, said first small bed and said large bed being maintained at an isomerization temperature and said second small bed at an aluminum halide condensing temperature, continuing the flow of gas until the concentration of aluminum halide in the second small bed reaches a value substantially in excess of its original value; then passing the gas through said first series of beds in a direction opposite to the previous flow through said beds, while maintaining the first two beds through which the gas passes at an isomerization temperature and the third bed at an aluminum halide-condensing temperature, continuing the flow of gas until the aluminum halide concentrations in the respective beds have been adjusted substantially to the proportions existing therein at the start of the previous run through said beds, then passing said gas through the second series of beds in a direction opposite to the previous direction of flow through said beds while maintaining the first two beds through which the gas passes at an isomerization temperature and the third bed at an aluminum halide-condensing temperature, and continuing the flow of gas until the aluminum halide concentrations in the respective beds have been adjusted substantially to the proportions existing therein at the start of the previous run through said beds.

WILLIAM W. WEINRICH.
JAMES M. YOST.